United States Patent
Guner et al.

(12) 
(10) Patent No.: US 6,502,301 B1
(45) Date of Patent: Jan. 7, 2003

(54) MANUFACTURING PLANT AND SYSTEM FOR MANUFACTURING RIGID BODIES

(75) Inventors: Mahmut Guner, San Jose, CA (US); David A. Rosenblitt, Mountain View, CA (US)

(73) Assignee: Gestalt Technologies, Inc., Santa Clara, CA (US)

( * ) Notice: Subject to any disclaimer, the term of this patent is extended or adjusted under 35 U.S.C. 154(b) by 0 days.

(21) Appl. No.: 09/571,345

(22) Filed: May 16, 2000

(51) Int. Cl.$^7$ .................................................. B23P 21/00
(52) U.S. Cl. .............................. 29/771; 29/791; 29/430
(58) Field of Search ........................ 29/429, 430, 469, 29/771, 782, 783, 791, 822

(56) References Cited

U.S. PATENT DOCUMENTS

| | | | |
|---|---|---|---|
| 4,894,908 A | * | 1/1990 | Haba, Jr. et al. |
| 5,152,050 A | * | 10/1992 | Kaczmarek et al. .......... 29/791 |
| 5,353,495 A | * | 10/1994 | Terabayashi et al. ......... 29/783 |
| 5,557,834 A | * | 9/1996 | Miyanaka et al. ............ 29/430 |
| 5,765,988 A | * | 6/1998 | Guner et al. .................. 29/469 |

* cited by examiner

*Primary Examiner*—David P. Bryant
*Assistant Examiner*—Jermie E. Cozart
(74) *Attorney, Agent, or Firm*—Dorsey & Whitney LLP

(57) ABSTRACT

A manufacturing plant for manufacturing rigid bodies comprised of a plurality of parts to be assembled by at least two operators having hierarchical skill levels selected from alignment types ranging from $O_r$ to P selected from an alignment transformation consisting of $O_r$, $O_a$, $B_r$, $B_a$, S, L and P, comprising an alignment unit having at least three work stations, each of said work stations being capable of having associated therewith dynamically occurring manufacturing operations selected from one or more of the dynamically occurring alignment-based transformations of manufacturing operations identified as alignment types $O_r$, $O_a$, $B_r$, $B_a$, S, L and P. Parts of the rigid bodies to be assembled in the manufacturing plant are delivered to the three work stations in accordance with the alignment-based manufacturing operation to be performed at the work stations to provide work-in-process whereby each of the at least two operators can perform at least one alignment-based manufacturing operation at each work station to provide s subsystem and thereafter permitting the operator to move from that one work station to another work station to perform another alignment-based manufacturing operation within the hierarchical skill level of the operator at the another work station.

11 Claims, 10 Drawing Sheets

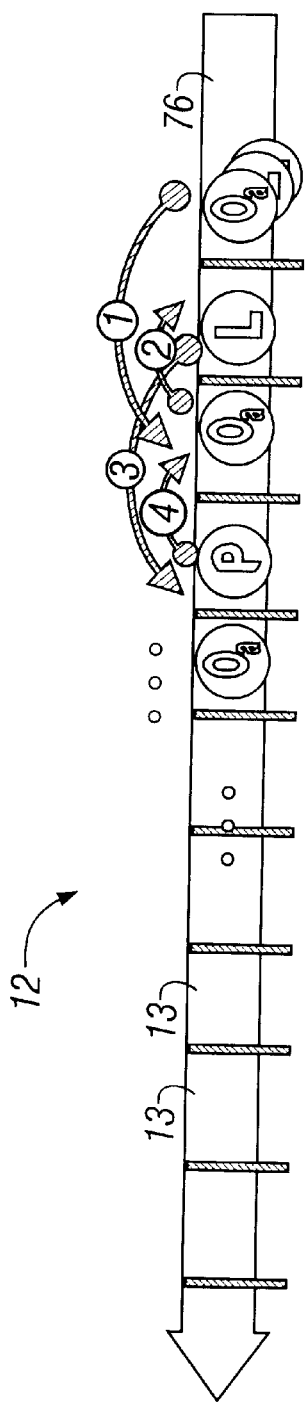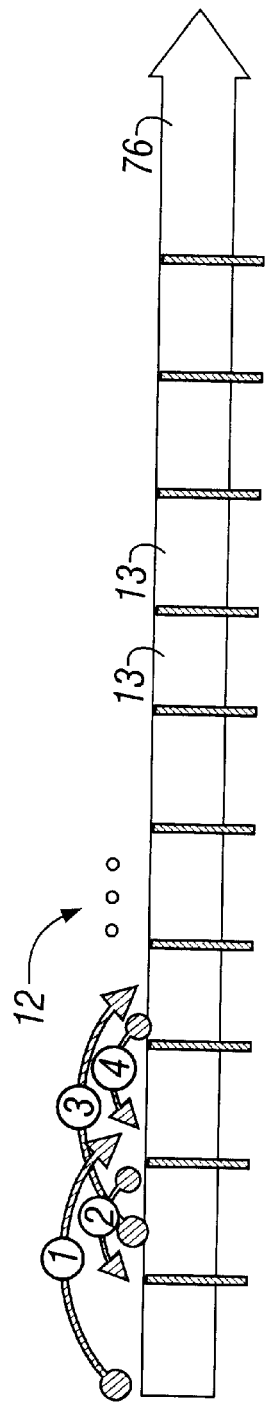
*FIG. 4A*
*FIG. 4B*

MANUFACTURING PLANT AND SYSTEM FOR MANUFACTURING RIGID BODIES

This invention relates to an alignment-based rigid-body manufacturing plant, system and method.

Manufacturing systems and methods have heretofore been utilized in manufacturing plants. In an output-based organizing system manufacturing operations are categorized in terms of the types of outputs generated and the tools used in production. For example, the category "mechanical joining" has the following sub-categories: pressure/cold welding, friction welding, ultrasonic welding, explosive welding, etc. Therefore, the number of distinct competencies is arbitrarily large, since outputs and tools continue to evolve (e.g., due to changes in technology). Such manufacturing line operations are often specific to the type of product or component being produced. Each line produces one type of product (where that product may be a finished good, a subassembly, or a component). Both "line" manufacturing and "modular" manufacturing are fixed from this point of view, since in both cases, a line or cell is dedicated to a particular type of product, and therefore require re-configuration in order to produce a new product. Producing new products (or new models of the same product) requires different operations. Conventional manufacturing systems have low adaptability, since whenever a product or component is modified or added, a work center must be added or modified. This discourages plants or factories from producing multiple product lines, which restricts the capability of the manufacturing system to adapt to the changing needs of the marketplace (e.g., quickly switching to a more popular product line). In fact, in many industries, the biggest barrier to mass-producing a new product model is the high "first-time-through" or "launch" cost of modifying work stations to develop new products or components.

With conventional manufacturing systems, unplanned jobs and new products are handled as exceptions, or events that cannot be handled by a workflow. New products typically require a new manufacturing infrastructure, which typically requires approximately several months to become operational. Furthermore, there is a significant learning curve to achieve standard levels of performance for new products. This learning curve results in lost opportunity costs. When exceptions arise, operations are in flux, and require timely adaptation in order to respond to the exceptional event or crisis. However, conventional, rigid manufacturing systems have difficulty responding quickly and effectively to changes or unanticipated events (i.e., exceptions to the normal, expected workflow). One typical response is to form new departments to handle exceptions, which guarantees that exceptions will continue to exist, and that the bureaucracy will continue to grow (the stream of exceptions becomes the rationale for the existence of these new departments). Thus there results a significant capital investment since a product-specific manufacturing infrastructure is required (where that infrastructure includes work stations, devices for transporting work-in-process and finished goods, equipment, machines, etc.).

Also long learning curves are required for operators to manufacture new products which result in unplanned jobs. Learning is limited with conventional manufacturing operations, since operator expertise is linked to specific output types and tools. Therefore, operators typically require new training whenever products and components are added or modified. In addition classical progressive lines causes worker idle time. The classical, balanced progressive line (e.g., a conveyor-driven assembly line) regulates the rate of production and enforces a maximum rate of productivity for every operator which cannot be faster than the slowest operator's rate of productivity. Therefore, all other operators must wait, in varying amounts of time, depending on their own productivity rate. Operators try to complete a job (e.g., install a part) within a fixed time interval. If they cannot perform the job within the allotted time interval, then it is finished at subsequent work stations. This has the advantage of guaranteeing a certain sustained rate of production. However, the disadvantage is that some workers will inevitably exceed the standard rate of production, and must wait, since no worker can go faster than the regulated production rate. Typically, there is a great deal of slack in standard production rates, which are often set below the productivity capacity of most workers (so that the great majority of, if not all, workers can achieve the standard rate).

Conventional operations also make achieving quality costly and increases cycle time. Steady inspection is required to maintain quality. A given individual (or group) would be responsible for all operations pertaining to a given component. In addition, these complex operations often contain common (therefore redundant) sub-operations, which makes it very difficult to modify operations in a coherent fashion. For example, using a conventional manufacturing system, there are separate work centers for manufacturing the various components of the final product. Unfortunately, such operations contain many redundant sub-operations that are performed at multiple work centers. When a process is modified at one work center, it should also be modified at the other work centers, in order to ensure consistent quality.

Ensuring consistent quality across redundant operations can be accomplished only using quality control techniques that are external to the operations themselves (e.g., statistical process control) and an additional management layer, which adds to the bureaucracy. In addition, redundant operations may compete for common resources (e.g., machines, or even human expertise), thereby introducing unnecessary resource sharing and scheduling problems. These difficult scheduling problems create large work-in-process queues at most activity centers, resulting in increased cycle time. Modular manufacturing exacerbates the fundamental limitations of line manufacturing. Modular manufacturing uses smaller production lines, which creates unrelenting quality concerns due to the greater vulnerability of these lines to absenteeism and sub-standard individual performance.

In recent years, the concept of "lean manufacturing" has gained popularity. The fundamental essence of lean manufacturing is its "backward-chaining", or goal-driven (pull) operation, where reasoning starts "backward" from the goal (in this case, the demand pull). All other lean manufacturing characteristics are derivable from this fundamental lean axiom. Implementations of lean manufacturing employ the principle of "production leveling", which generates production plans relative to a "batching" time interval (this time interval is typically about one month). Since planning production over small time intervals (for example, daily, or even hourly intervals) is considered to be infeasible due to its complexity, production leveling is considered to be necessary in order to make lean manufacturing practical. Unfortunately, the practice of production leveling constrains the ability of the factory to respond quickly to change (i.e., within a very small time interval), on a systematic basis (i.e., without expediting). (A capability for rapid response to change would promise to increase sales by rapidly adjusting production to satisfy demand spikes.) "Flexibility" associated with lean manufacturing is based on various ways of re-shuffling personnel. Cross-training enables personnel to be re-assigned to a variety of production lines (to respond to demand fluctuations). However, there is typically a significant learning curve when operators begin work on a new production line. Overtime increases the capacity of a production line (to respond to increased demand). Layoffs reduce the capacity of a production line (to respond to reduced demand). Lean manufacturing, however, does not overcome the fundamental rigidity of conventional manufacturing, as lean production lines are still "fixed" in the sense that they are dedicated to a specific product or model. Switching a line over to a new product still incurs significant "first-time through" or "launch" costs and delays. Therefore, a factory's capacity to produce a given product is constrained by the capacity of the production line associated with that product.

In U.S. Pat. No. 5,765,988 there is disclosed a continuous apparel-sewing manufacturing system which is specifically directed to shape-adjustable apparel and discloses the use simultaneous manufacture at a series of work centers located around a single staging area.

In view of the above-identified and other deficiencies found in prior art manufacturing systems and methods, there is a need for a new and improved manufacturing plant, system and method which overcomes these deficiencies which is particularly applicable to rigid-body manufacturing.

In general, it is an object of the present invention to provide an alignment-based rigid-body manufacturing plant, system and method in which manufacturing operations are categorized in generic categories of dynamically occurring alignments of core operations.

Another object of the invention is to provide a plant, system and method of the above character in which these generic categories of alignments transcend a particular type of output from the manufacturing plant and the tooling utilized in the manufacturing plant.

Another object of the invention is to provide a plant, system and method of the above character in which the generic categories of alignments may be utilized to manufacture a wide variety of products and in which each product is manufactured with the use of specific sequences of these generic categories of alignments of core operations.

Another object of the invention is to provide a plant, system and method of the above character in which plants are formed into alignment units.

Another object of the invention is to provide a plant, system and method of the above character in which each alignment unit is comprised of at least three work stations and at least two operators.

Another object of the invention is to provide a plant, system and method of the above character in which each work station is capable of being associated with one or more alignment-based manufacturing operations.

Another object of the invention is to provide a plant, system and method of the above character which utilizes a mobile rotating work force in which the operators are permitted to work at their own speed.

Another object of the invention is to provide a plant, system and method of the above character in which operator rotation is used to eliminate idle time and to avoid conflicts of interest.

Another object of the invention is to provide a plant, system and method of the above character in which an operator at one work station after completing an alignment-based manufacturing step at that work station can advance to another work station to perform another alignment-based manufacturing operation.

Another object of the invention is to provide a minimal if not zero operator idle time thereby resulting in increased productivity while maintaining sustained production rates.

Another object of the invention is to provide a plant, system and method of the above character in which short runs can be readily assimilated.

Another object of the invention is to provide a plant, system and method of the above character in which short runs are made feasible by substantially zero set-up costs being incurred at the work stations while still retaining the ability to switch products and styles, thereby making it possible for a production line to simultaneously produce diverse types of products, i.e. in batches of arbitrary size and even batches of one without incurring significant learning curves for the operators or first-time through or launch costs.

Another object of the invention is to provide a plant, system and method of the above character in which the core operations do not require modification to produce a new style with the result that core operations which may require quick adjustments to operating parameters are essentially unchanged.

Another object of the invention is to provide a plant, system and method of the above character in which flexible manufacturing and production of small lots of arbitrary product mix can be readily accomplished and in which successive items being manufactured may be different models without the maintenance of large inventories of work-in-process.

Another object of the invention is to provide a plant, system and method of the above character in which short cycle times can be readily achieved because of the elimination of long set-up times when switching between products.

Another object of the invention is to provide a plant, system and method of the above character in which unplanned jobs and new products can be handled routinely.

Another object of the invention is to provide a plant, system and method of the above character in which the generic categories of alignment operations are applicable to any type of product that is a rigid body.

Another object of the invention is to provide a plant, system and method of the above character in which quality continuously improves because the operators become expert alignment specialists capable of performing alignments with similar dynamics on a variety of components, subassemblies and final assemblies.

Another object of the invention is to provide a plant, system and method of the above character in which average operators are capable of achieving high levels of quality, reversing the existing trend where highly skilled operators achieve only standardized levels of quality.

Another object of the invention is to provide a plant, system and method of the above character in which the alignment-based manufacturing operations are self-correcting because they contain no redundancies because a unique work center and therefore unique individuals are always responsible and therefore accountable for the result.

Another object of the invention is to provide a plant, system and method of the above character in which quality deviations can be readily detected by the next work center or station in the flow because typically the next operation or sequence cannot be performed if the previous operation was performed poorly or incorrectly, reducing the need for reliance on external quality control monitoring.

Another object of the invention is to provide a plant, system and method of the above character in which sudden increases in demand can be readily accommodated by dynamically adjusting the product mix which is feasible because of the nearly zero set-up cost and time.

Another object of the invention is to provide a plant, system and method of the above character in which a significant reduction in training costs of operators can be readily obtained by focusing training efforts on each of the generic alignment-based operation categories, thereby avoiding cross-training on a wide variety of specific products and styles.

Another object of the invention is to provide a plant, system and method of the above character which makes possible improved ergonomics because operators although performing a series of alignments of the same type, these alignments are performed by a dynamically varying mix of specific styles and subassemblies, thereby eliminating the probability of repeating muscle movement sequences and thereby reducing the risk of repetitive strain injuries.

Another object of the invention is to provide a plant, system and method of the above character which by providing operators with alignment specialties results in less monotony and repetitiveness for the operator.

Another object of the invention is to provide a plant, system and method of the above character in which flexible working hours can be readily accommodated because the manufacturing hours can be arbitrarily spread over the manufacturing plant's up time since a production line can operate efficiently even without full attendance.

Another object of the invention is to provide a plant, system and method of the above character in which material delivery constraints can be relaxed because since the operators are mobile and can move from station to station, the operators can pick up parts over a wider area during their movements between work stations.

Another object of the invention is to provide a plant, system and method of the above character in which continuous manufacturing is undertaken with alignment units that are self scheduling requiring no external scheduling or expediting.

Another object of the invention is to provide a plant, system and method of the above character in which work-in-process queues are used whereby priorities are fully determined by the order in the queue, resulting in a continuous flow of items from the work-in-process queue to the work stations.

Additional objects and features of the invention will appear from the following description in which the preferred embodiments are set forth in detail in conjunction with the accompanying drawings.

FIGS. 4A and 4B are illustrations showing linear rotation of operators in accordance with the present invention.

In general, a manufacturing plant for manufacturing rigid bodies is comprised of a plurality of parts to be assembled by at least two operators having skill levels selected from alignment types of $O_r$, $O_a$, $B_r$, $B_a$, S, L and P. The plant comprises at least three work stations each of which being capable of having associated therewith manufacturing operations selected from one or more of the dynamically occurring alignment-based manufacturing operations characterized as $O_r$, $O_a$, $B_r$, $B_a$, S, L and P. Means is provided for delivering parts of a rigid body to the at least three work stations in accordance with the alignment-based manufacturing operation to be performed at the work stations whereby each of the at least two operators can perform at least one alignment-based manufacturing operation at each work station and permitting the operator to move from one work station to another work station during the performance of additional alignment-based manufacturing operations.

Figure 1:
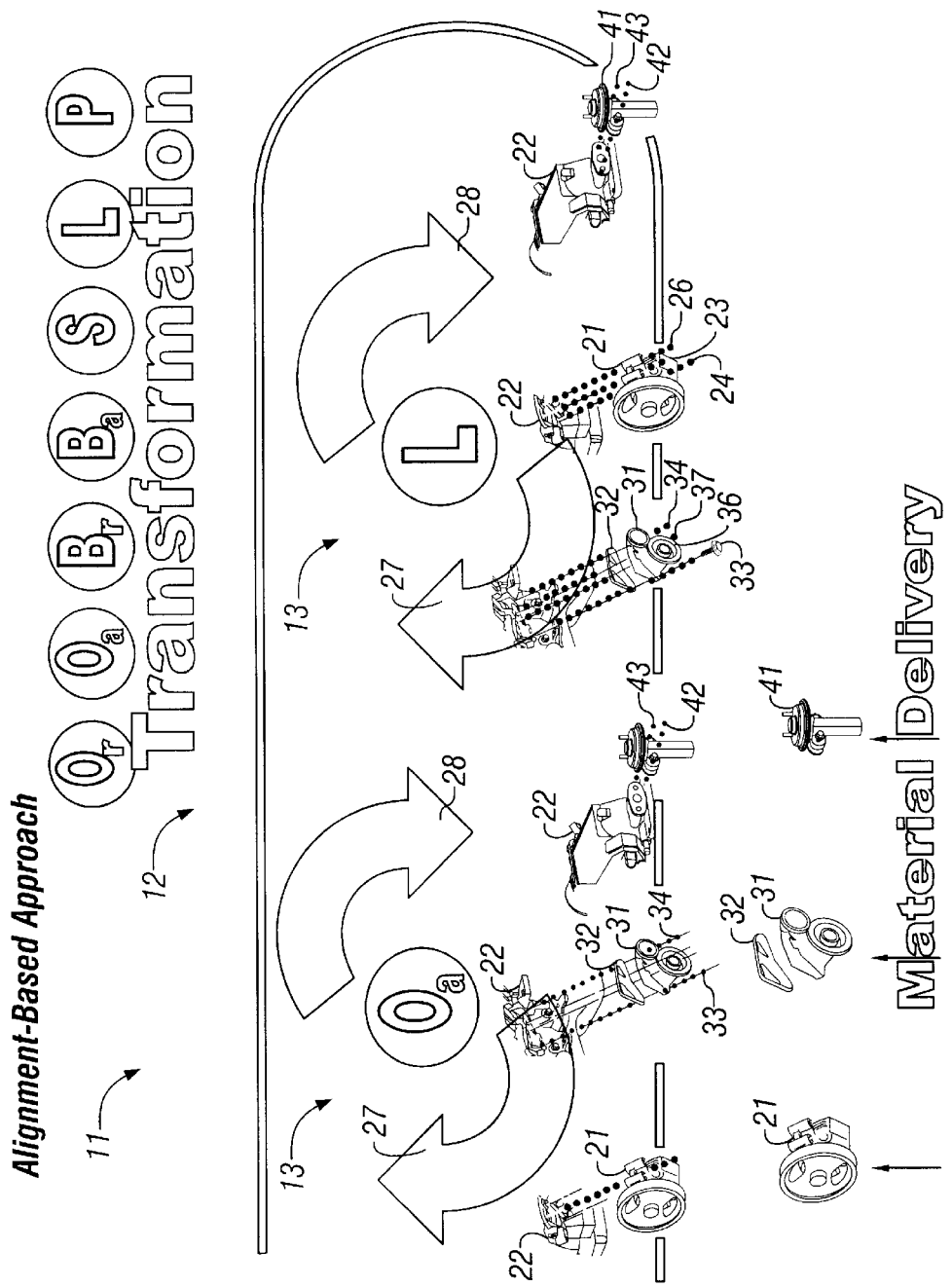
FIG. 1 is a schematic diagram of a plurality of alignment-based manufacturing operations for use in a manufacturing plant, the system and method incorporating the present invention utilizing an alignment-based approach.

More in particular, the alignment-based rigid-body (i.e., products that are non-fluid, and are not shape-adaptable, or flimsy as for example clothing) manufacturing plant, system and method of the present invention utilizes an alignment-based approach in which materials and/or parts are delivered in a manufacturing plant 11 to be transformed into a finished product which in FIG. 1 has been identified as a transformation consisting of seven alignment operations which are shown in FIG. 1 and which are identified as $O_r$ (Relative Overlay), $O_a$ (Absolute Overlay), $B_r$ (Relative Boundary Alignment) $B_a$ (Absolute Boundary Alignment), S (Sculpting), L (Linear Feedback), and P (Positioning). These seven alignment operations are sufficient for manufacturing any type of rigid body in the form of a specific product. As hereinafter set forth, each specific product will require a specific sequence of the above-identified alignment operations in which tools of various types are applied to aligned components and subassemblies.

The seven alignment operations identified above constitute a hierarchy as set forth below in order of decreasing difficulty.

1) Overlay: An alignment of two bodies, where the dynamics of the alignment focuses on the bodies (rather than the edges, as set forth in Boundary Alignment below). There are two types of overlays:
  a) Relative Overlay. ($O_r$): an overlay involving two moving bodies
  b) Absolute Overlay ($O_a$): an overlay involving one moving body and one stationary body (e.g., placing one object on top of, or inside of, another stationary object).

2) Boundary Alignment: An alignment of two bodies, where the dynamics of the alignment focuses on the edges of the bodies (e.g., sliding, snapping, or plugging in one object into another object via edge guides). There are two types of boundary alignments:
  a) Relative Boundary Alignment ($B_r$) a boundary alignment involving two moving bodies
  b) Absolute Boundary Alignment ($B_a$): a boundary alignment involving one moving body and one stationary body.

3) Sculpting (S): Any operation that permanently changes the shape of an object (e.g., breaking/removing a protective plastic layer, or applying a full bend to a component that was already partially bent, or creating holes, notches, grooves, etc.).

4) Linear Feedback (L): An operation where the feedback is linear, and therefore predictable, such as most fastening operations (e.g., welding, screwing, riveting, hammering). However, it should be noted that fastening the first fastener is typically classified as either an overlay or boundary alignment operation (since the first fastener must achieve the initial alignment between two bodies), while fastening subsequent fasteners is a linear feedback operation that reinforces the alignment achieved by applying the first fastener. There is a clear signal given at the end of an L operation (indicating to the operator that his or her task is done).

5) Zero Feedback, or Positioning (P): An operation requiring the least skilled alignment, since after the operator performs the initial alignment, continual feedback and-re-alignment during the execution of the operation is not required (e.g., pushing simple clips into place). (In contrast, linear feedback operations requires some feedback and re-alignment during execution.) Often, a machine performs the actual operation, since the factory worker or operator performs the initial "positioning". Feedback only occurs at the end of the operation. For example, a "click" is heard after inserting a part, where there is no feedback during its actual insertion, or when an operator pours fluid into a container until the fluid reaches a certain level.

It should be noted that the linear feedback and positioning operations are the best candidates for automation, because both operations have a clearly defined ending point. In addition, since positioning requires no feedback or re-alignment during execution, it is relatively simple for an automated machine to adjust to linear feedback. Successful automation requires that an automated machine be able to perform the initial placement of rigid bodies to be aligned.

The above operations form a skill hierarchy. Thus, an operator or worker capable of performing an overlay should be capable of performing a sculpting operation, and so forth down the hierarchy. An operator or worker capable of performing a relative overlay should be capable of performing any of the other alignment operations.

Although the results of different alignment operations may be similar, these results are arrived at via different alignment dynamics. From a static examination of the results of relative overlay and boundary alignment operations, it can be observed that both operations link the edges of objects. Although it is true that both relative overlay and an absolute boundary alignment may involve "joining at the edge", the key point is that the dynamics of these two operations are very different, requiring distinctly different types of skill. The dynamics of a relative overlay operation primarily involve the entire "bodies" of two moving objects to be aligned. In contrast, the dynamics of an absolute boundary alignment operation primarily focus on the "edges" of the objects to be aligned (where one object remains stationary). Note that these operations are not specific to particular objects, but are universally applicable to all objects which are used to form rigid bodies.

In a positioning operation, the operator does not intervene in the operation once it begins (i.e., no re-alignment is required during the application of the relevant tooling). The expertise in performing positioning operations lies in preparing the work-in-process prior to performing the operation itself. These preparations are reversible material handling or alignment operations (e.g., folding without leaving crease marks). Thus, an operator has more than one chance to prepare/align the material and tools prior to performing the actual operation. If the operator makes a mistake in preparing the material, the operator may re-prepare the material without causing a defect. Thus, an operator has multiple chances to "get it right" prior to performing the actual operation. (For example, some positioning operations allow the operator to target a position via a red light. If the red light is off target, it may be re-positioned without causing a defect. Once the red light is on target, it is safe for the actual operation to proceed.) In contrast, with an overlay operation, alignment is an ongoing, dynamic activity that occurs concurrently and continuously with the actual operation. If an overlay operator makes a mistake in dynamically positioning the work-in-process, a defect will result. Therefore, overlays require greater expertise than positioning operations.

This alignment-based approach hereinbefore described can be utilized in a plant or factory 11 schematically illustrated in FIG. 1 which includes two or more alignment units 12 which may be in the same plant or factory or in different plants or factories. Each alignment unit 12 includes a plurality of work stations 13 which are at least three in number. Each of the work stations 13 has associated therewith an alignment type selected from one of the seven generic alignment types hereinbefore described. If desired, the alignment type may change from operation to operation as an operation is performed in the work station. Thus, each work station 13 can also be characterized as an alignment unit in which each alignment unit is responsible for the production of a single system or subsystem. Each system can be defined as a set of interacting elements that are tested as a unit, where any system element can in turn be a system resulting in a hierarchy, or graph of systems and subsystems.

The plant, system and method of the present invention requires the use of a mobile rotating work force comprising a plurality of operators in which the number of work stations 13 will always be greater than the number of operators so that each operator is capable of being able to move to another work station after the operator has finished an operation at the work station he/she is presently located, thereby avoiding idle time, one of the principal tenets of the present invention. By way of example, the ratio of work station to operators can be approximately 1.5 work stations per operator for small alignment units (e.g., 15 work stations for 10 operators) and approximately 1.2 for large alignment units (e.g., 120 work stations for 100 operators). To minimize the complexity of dealing with large groups of operators, it is desirable that alignment units contain 100 operators or less. Pragmatic reasons may dictate dividing alignment units into smaller pieces or operations. With such a plant, system and method, the operators are free to work at their own speed without requiring other operators to match their speed, which is made possible by operator rotation to different work stations to eliminate idle time.

The mobile rotating work force consists of a plurality of operators or workers greater than two with each operator having associated therewith an alignment type. As pointed out above, the alignment types are organized into a skill hierarchy. Thus any operator with a given alignment type X is capable of performing alignment types that are below X in the skill hierarchy. For example an operator whose alignment type is "absolute overlay" ($O_a$) is capable of performing boundary alignment, sculpting, etc. However, the absolute overlay operator cannot perform relative overlay since relative overlay is above absolute overlay in the skill hierarchy.

In connection with the protocol of the present invention, if an operator having one of the above-identified alignment type skills performs such an operation at a work station 13, that work station will change its alignment type by that operator pushing a control to indicate a completion of the operation or by other control means as for example by the turning of a page in a work manual. Assuming that the alignment type to which the work station changes is in the hierarchy above the skill of the operator or by the operator remaining at the work station creates a conflict of interest for the operator, that operator can move to another workstation 13 and perform another operation requiring his/her skill.

Another operator having a skill level matching that of the alignment type required by the next step to be performed at the work station or alternatively having a higher skill level can perform the next step to be performed in that work station. By way of example a shop floor control system (e.g., a simple series of paper on-line schematics) can indicate the specific operation to be performed next at that workstation. Typically such schematics can omit some details since the operator knows that the type of alignment operation to be performed.

Typically it is preferable in the present invention that the work-in-process remains at a single work station with the operators and tools of various types moving between the work stations in a non-linear fashion (i.e., not in a production line fashion) to perform various alignment operations. However, in accordance with the present invention it may be necessary on certain occasions to move the work-in-process.

In connection with the present invention it is desired that a worker mobility protocol be observed. The mobile operators with their hierarchical skill levels work asynchronously under specific rules of movement to decide how to rotate between work stations. For example a worker who has completed a desired task at a work station thereafter looks to nearby work stations, i.e. to the left (or counterclockwise), to ascertain whether or not there is a work center or station whose alignment type matches his/her skill level. That worker would move to the nearest such station. Alternatively if any of the nearby work stations have an alignment type which is below that of the skill hierarchy of the operator, then the operator can move to the nearest such station. After the task at that work station has been performed, the operator will look to nearby work stations for work stations whose alignment type matches the operator's skill level. If the operator cannot find such a work station, then the operator will look for a work station which has an alignment type below his/her skill hierarchy and go to that station, thereby ensuring that the operator will always have work available to him/her with no idle time.

Operator rotation at different work stations in addition to eliminating idle time also makes it possible to avoid "conflicts of interest" which can occur when the same part is aligned by the same operator on multiple occasions and one or more subsequent alignments depends on one or more earlier alignments. When such a conflict of interest occurs, the operator has an incentive to "hide" previous mistakes by performing "pseudo-repairs" which do not fully undo the mistake, but are sufficient to reduce the chance of detection. On the other hand, if a new operator performs an alignment on a part that was misaligned by an earlier operator, the new operator has no incentive to cover up the mistake but in fact has an incentive to report the mistake so that he/she does not run the risk of being associated with the defect.

In achieving worker mobility as set forth above, it is important that material flow to the work stations be separated from operator flow so that material flow never interferes with operator movements (e.g., by providing a separate material flow aisle that is disjointed from operator movement/rotation paths).

In connection with such protocols it is important that dynamically moving tools be provided to the various work stations to match the variable alignment types of work to be performed at the work stations. Alternatively, each of the work stations can have associated therewith all the possible tools needed for performing all of the alignment functions to be performed at that work station.

This alignment-based transformation is a transformation from an art to a science which defines a new paradigm. Thus there is shown in FIG. 1 a work station 13 which has associated therewith the alignment type $O_a$ in which material is delivered to the work station as shown in FIG. 1 which by way of example can be a steering wheel pump 21 which is to be mounted on an engine 22 by way of example by three screws. In the prior art method of assembly, all three screws would be put in place by one person by an appropriate tool. In the present invention, the operator having the alignment type skill would move the two parts together, i.e. the steering wheel pump 21 with the engine 22 and in connection therewith would use overlay dynamics so that one hole in the steering wheel pump would register with the one hole in the engine 22 and thereafter fasten the two parts together with a single screw represented by the broken line 23 to complete the $O_a$ operation. Placing this first screw is the most difficult screw to place because of the alignment required, requiring an absolute overlay. The other two screws represented by broken lines 24 and 26 can then be inserted by an operator having a lower skill level as for example an L skill level could insert the other two screws as shown in FIG. 1, which requires much less skill because the alignment operation between the two parts had already been accomplished by the prior operator. As hereinbefore explained, the prior operator then can move to other work stations under the operator rotation protocol as hereinafter described and represented by the arrows 27 and 28.

As shown in FIG. 1, in a similar manner, a drive in oil filter adapter 31 and 32 can be alignment type $O_a$ and an $O_a$ a operator can perform the necessary alignment operations and insert two screws 33 and 34 which can be hand tightened. Thereafter two additional screws 36 and 37 can be inserted by an operator having an alignment type L skill level and thereafter all four screws 33, 34, 36 and 37 can be torqued by an appropriate tool up to a maximum desired torque to complete that operation.

Similarly as also shown in FIG. 1, a drive in exhaust recirculation valve 41 can be secured to the engine 22 by an operator having an alignment type $O_a$ skill by appropriate alignment and hand tightening of the screws. Thereafter, an operator having an alignment type L skill can use an appropriate tool to torque the screws 42 and 43 to a desired tightness.

From the foregoing it can be seen that an absolute overlay operator performs the more critical functions of providing correct alignment of the parts with the linear feedback operator completing the less difficult tasks. From this it can be seen that operators have no attachment to any specific part but rather to a type of alignment dynamics (e.g., the dynamics of absolute overlay or linear feedback). Furthermore, alignment dynamics transcends tooling. The same alignment dynamics may be performed via numerous means. For example an absolute overlay can be performed using welding, screws, adhesives, etc. The key point is that absolute overlay refers to the fundamental alignment of a stationary part (e.g., in the engine) and a moving part (e.g., a power steering pump or oil filter adapter).

Figure 2A:
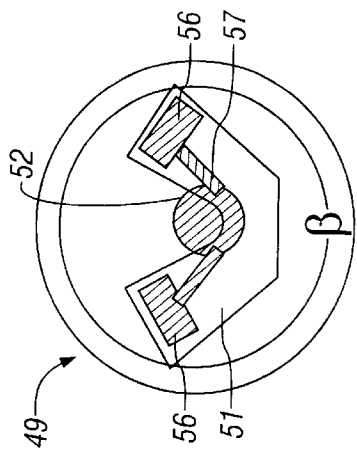
FIGS. 2A, 2B, 2C and 2D are schematic illustrations of an engine showing systems and subsystems which each comprise a set of testable, dynamically interacting elements manufactured in accordance with the present invention.

In connection with the present invention, the end products or assemblies can be viewed as layers of systems where a system is defined as a testable set of dynamically interacting elements with no extraneous elements. By way of example, an engine 49 is used as a hierarchy of systems or subsystems. Thus as shown in FIG. 2A, the least complex set of dynamically interacting elements of an engine 49 is the subsystem α consisting of an engine block 51 and a crank shaft 52 which is a subassembly that can be tested by turning the crank 52 in the engine block 51, which assuming that test is passed, then proves the confidence level of the reliability of the subsystem aα.

Figure 2B:
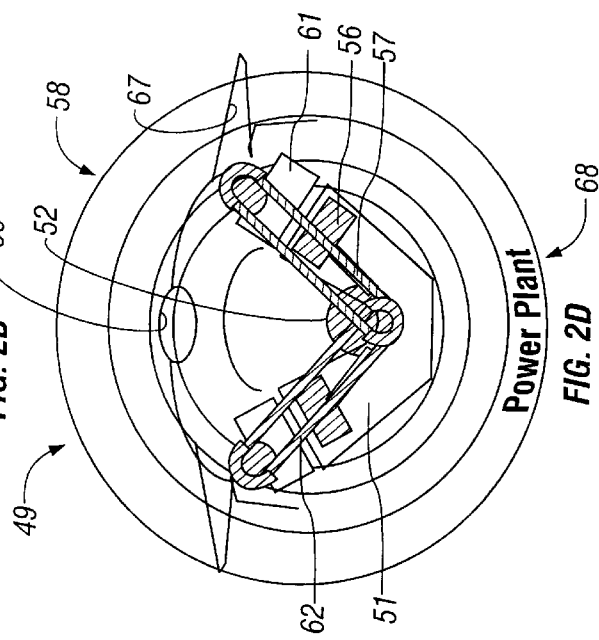

The next level in the hierarchy would be subsystem shown in FIG. 2B, which includes the subsystem a but with pistons 56 and connecting rods 57 mounted in the engine block 51 and connected to the crank shaft 52 to provide an assembly of a higher level which can be tested.

Figure 2C:
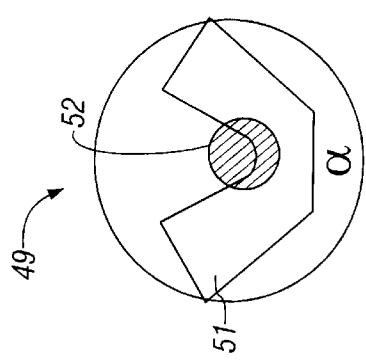

At a still higher level, a mechanical subsystem 58 is provided as shown in FIG. 2C which consists of the subsystem β with the addition of a cylinder head subsystem 61 and timing chains 62 to provide a system which also can be tested.

Figure 2D:
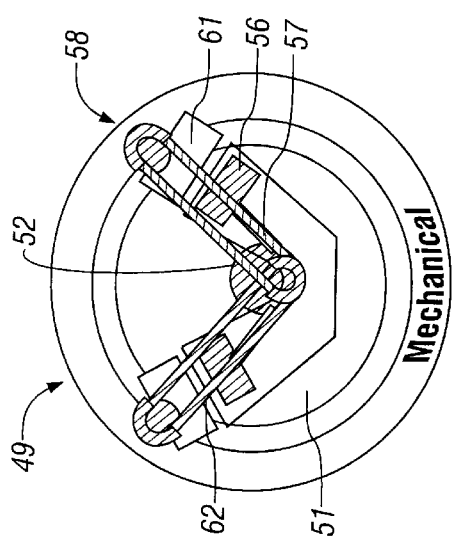

A still higher-level system in the hierarchy is shown in FIG. 2D in which the mechanical subsystem 63 shown in FIG. 2C is combined with intake and exhaust ducts 66 and 67 to provide a power plant 68 which can be tested.

Figure 3A:
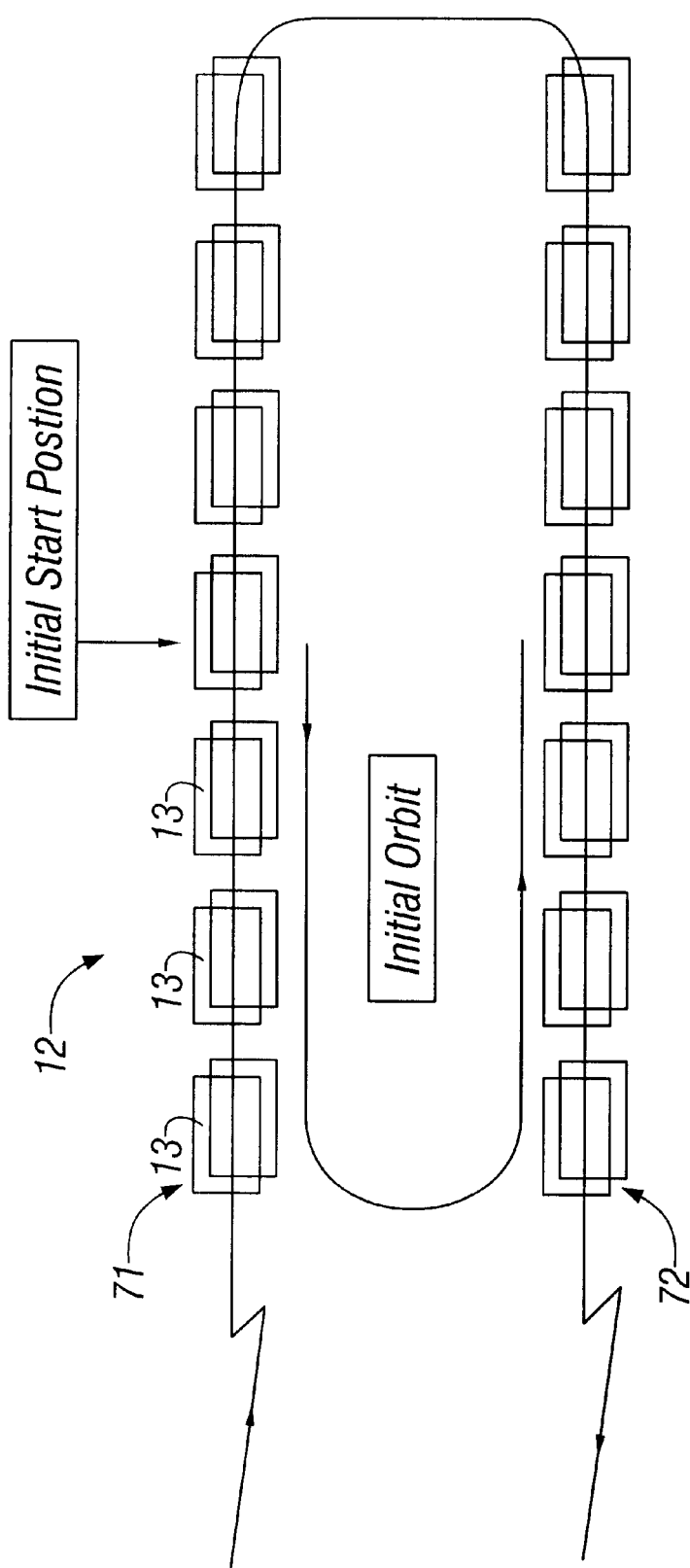
FIGS. 3A, 3B, 3C and 3D are illustrations showing spiral rotation of operators in various orbits.

In connection with the plant, system and method of the present invention, different types of operator rotation can be utilized with the alignment units 12 in the plant or factory 11. Two types of operator rotation are described herein, one being identified as spiral (2-dimensional) operator rotation and the other being identified as linear (1-dimensional) operator rotation. It has been found to be desirable to utilize spiral rotation when alignment unit 12 can be arranged into pairs of parallel rows of work stations 13 and in which it is possible for the operators to move easily (i.e., without being inhibited by physical obstructions) between the two rows of parallel work stations 13. Such a spiral rotation system is shown in FIGS. 3A through 3D. As shown in FIG. 3A, the work stations 13 are arranged in two rows 71 and 72 in which row 71 can be characterized as an upper row and row 72 can be characterized as a lower row. In FIGS. 3A through 3D there is illustrated a spiral pattern of rotation between these two parallel rows of work stations in which operators follow a spiral pattern of movement in which they travel in elliptical orbits between the work stations in the two rows, typically traversing an equal number of work stations in each row. Preferably the size of each orbit should be the same for all operators in order to minimize confusion. Also in order to minimize confusion typically all the operators should initially rotate in the same direction (i.e., clockwise or counterclockwise). If the work-in-process is in continuous motion (e.g., on a continuous-flow conveyor system) the operators should initially rotate against the direction of conveyor flow. This is because the work will initially flow toward the operators, requiring less walking by the operators.

Each operator in the spiral rotation will have a different starting position within the alignment unit. For example an initial start position is indicated in FIG. 4A. The goal is to have each operator eventually traverse every work station within the alignment unit to maximize learning, maximize diversity of work assignments, and thereby minimize ergonomic risks. Note that it is also possible for operators to rotate in a purely "circular" fashion, such that each operator rotates among a small set of work stations (i.e., without the "shifting" involved with spiral rotation). While circular rotation has the advantage of simplicity, it does not gain the quality and learning benefits associated with having operators rotate through a wider variety of work stations. Preferably half of the operators begin their rotations through the work stations of the upper row 71 and the other half will begin rotation through the work stations in the lower row 72 and thereafter with each individual operator following a spiral rotation algorithm/protocol.

As shown in FIG. 3A, the operator starting from the initial start position shown in FIG. 3A travels in a counterclockwise initial orbit which typically is comprised of an equal number of work stations in the upper and lower rows 71 and 72 to form the elliptical path shown by the initial orbit in FIG. 3A. The operator in this initial orbit searches for a work station within this elliptical orbit that requires his or her alignment skill. For example if an operator is at skill level $O_a$ then the operator first searches for a work station that needs an $O_a$ operation to be performed. As soon as an operator finds an appropriate work station, the operator performs the required alignment operation with preference being given to work stations near the beginning of the elliptical orbit rather than to work stations occurring near the end of the orbit.

In the event the operator fails to find a work station which matches his or her skill level, then the operator continues searching the work stations within the current orbit and searches for an alignment operation at the skill level immediately below the operator's current skill level in the skill hierarchy. The operator continues going through the skill hierarchy, i.e. through the seven alignment categories that form the hierarchy, until the operator succeeds in finding an alignment operation below his or her skill level at a work station within the operator's current orbit. The operator then moves to that work station and performs the required alignment operation.

Figure 3B:
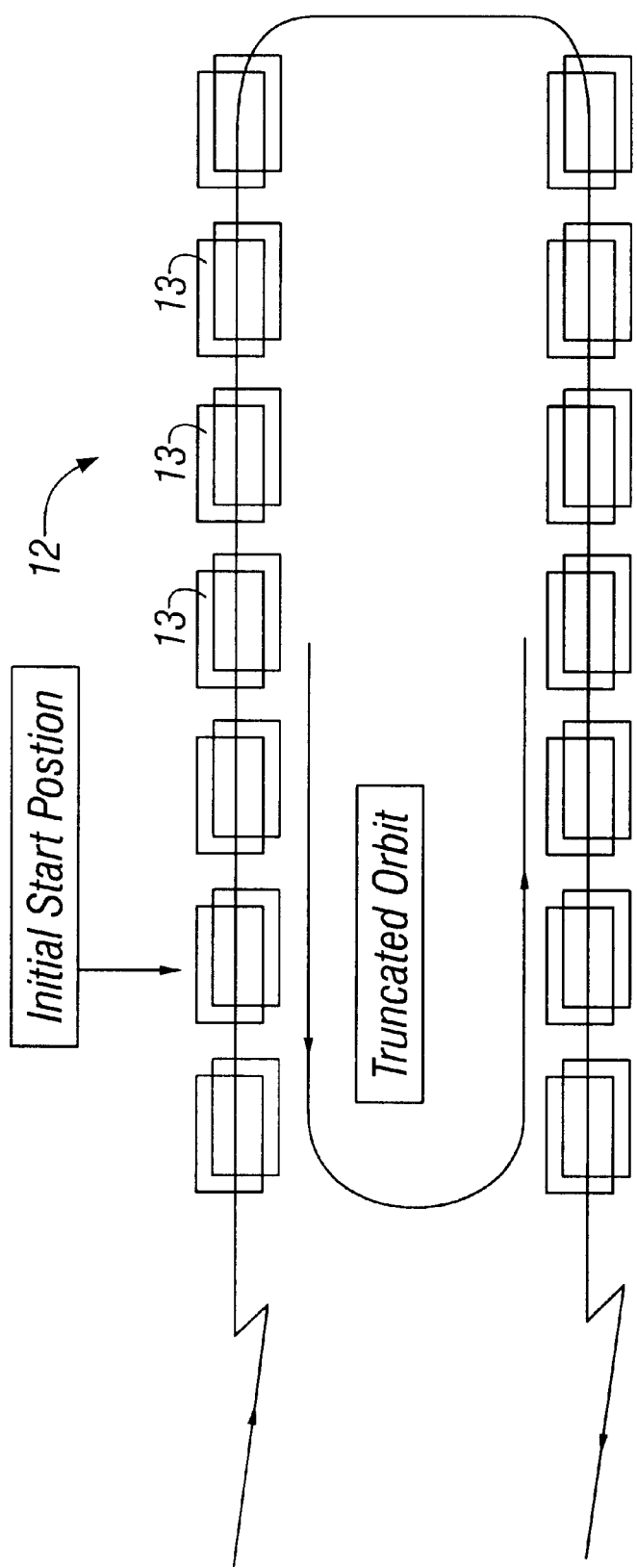

As shown in FIG. 3B, when the operator's initial start position is near the end of one of the rows as for example the upper row 71 of the orbit, a truncated elliptical path must be followed by the operator.

Figure 3C:
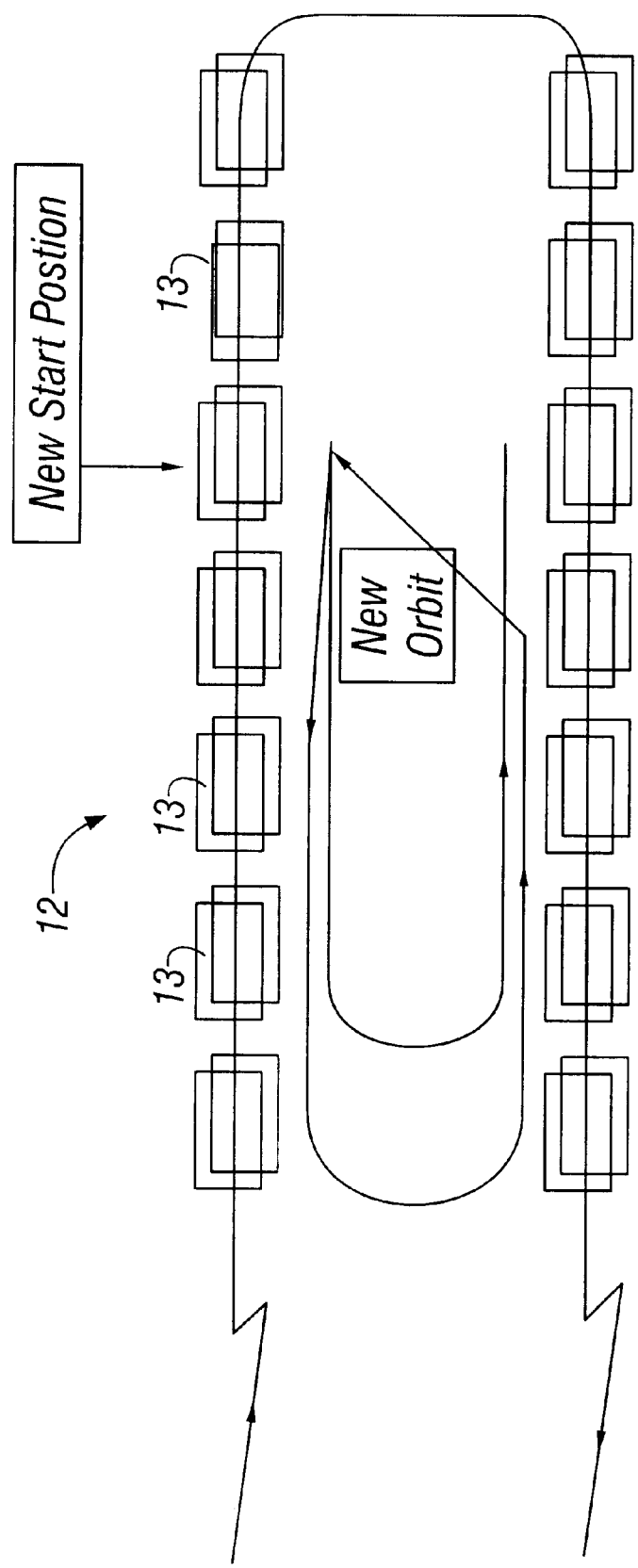
Figure 3D:
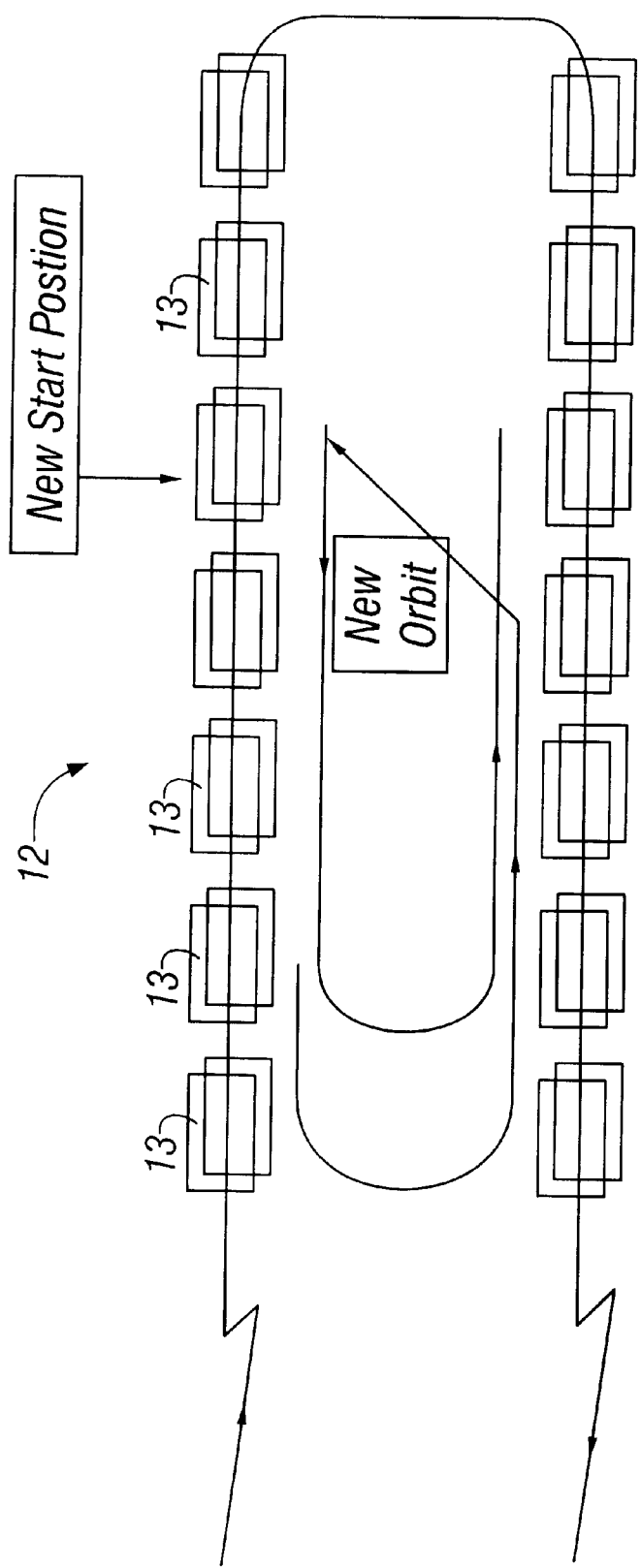

When an operator has completed a traversal of the initial or truncated orbits shown in FIGS. 3A and 3B, the operator shifts his or her start position by one work station as for example the work station identified as the new start position in FIG. 3A to the new start position as shown in FIG. 3C. If the previous orbit was a truncated orbit as shown in FIG. 3B, then the operator will shift by more than one so that the new starting position would be the same as if the operator had completed a full orbit instead of a truncated orbit as shown in FIG. 3D.

In this connection it should be pointed out that if an operator is unable to find a suitable alignment operation within his or her current orbit, then he or she incrementally shifts orbits and tries again in the new orbit. In this manner, it can be seen that successions of elliptical orbits form a spiral path which corresponds to the moniker given to this procedure.

On each successive elliptical orbit, the operator's new starting position will shift one work station either to the right or the left depending on whether counterclockwise or clockwise orbits are initially utilized until the operator reaches one of the two row boundaries, either the leftmost or rightmost station of the row. Once a row boundary is reached, the operator reverses direction and begins moving in successive spirals until the opposite row boundary is reached, at which point the operator reverses direction again. In this manner via a succession of spiraling paths the operator will eventually traverse every work station in the pair of rows.

Many variations of the basic spiral rotation pattern are possible. The simplest case has two rows of work stations, as described above. It is also possible to form an arbitrary polygon, such as a triangle, quadrilateral, pentagon, etc. (or an enclosed shape composed of curved edges) out of rows of work stations, such that a variation of the basic spiral and/or linear (as described below) rotation patterns are followed.

When spiral operator rotation is not possible when an alignment unit cannot be arranged in two parallel rows that are easily accessible to the operators, linear rotation becomes necessary. In FIG. 4A linear rotation is illustrated in which a single row 76 of work stations 13 is provided. Operators traverse the work stations primarily in a single direction (e.g. to the left as in FIG. 4A) with only occasional movements in the opposite direction. Each operator has a primary direction of motion, either to the left or right, indicating a primary bias of movement toward the left or right. The direction opposite the primary direction is called the secondary direction (e.g., if the primary direction is the left, the secondary direction will be the right). The following linear rotation algorithm/protocol is to be followed by each individual operator.

Primary and secondary search intervals are determined. Each search interval determines how many work stations an operator will search for a suitable alignment operation to perform. Thus each operator is provided with a primary search interval and a secondary search interval. The primary search interval should always be at least one greater than the secondary search interval to induce a bias toward movement in the primary direction. For example in FIG. 4A arrows 1 and 3 represent large movements to the left, while arrows 2 and 4 represent shorter movements to the right. As an initial default, to minimize unnecessary movements, it is preferred that minimal intervals be used, namely a primary interval of 2, and a secondary interval of 1.

An operator in searching for an alignment operation corresponding to his or her skill level, the operator from his or her current position searches for a work station first within the operator's primary search interval (favoring work stations that are closer to his or her current position) and then within the operator secondary search interval (favoring stations that are closer to his or her current position) which requires the alignment skill associated with the operator. If the operator succeeds in finding such a work station, then the operator moves to that work station and performs the required alignment operation. The operator then repeats the same procedure from the operator's new position. If the operator fails to find an operation matching his or her skill level, then the operator again searches the work stations within the primary and secondary search intervals and searches for an alignment operation at the skill level immediately below the current skill level in the skill hierarchy and continues this procedure until the operator has searched for the lowest-skilled alignment operation. If the operator succeeds in finding an alignment operation below his or her skill level at a work station within the operator's current orbit, then the operator moves to that work station and performs the required alignment operation. The operator then repeats the procedure from this new position.

If an operator fails to find a suitable alignment operation at a work station within the operator's primary or secondary search intervals, then the search intervals are incremented and then the operator searches for an alignment operation matching the operator's skill level and failing that searches for an alignment operation below the operator's skill level. If this still fails, then the operator searches again, this time incrementing the secondary interval. If this still fails, the search continues, incrementing the primary interval, etc. Eventually the operator will find a suitable job to perform at some work station, possibly after incrementing the primary and/or secondary search intervals one or more times. Thereafter it may be desirable to reset the operator's search intervals to the default search intervals.

Once an operator reaches the row boundary (either the leftmost or rightmost work station in the row), the operator reverses his or her primary and secondary directions of motion. For example if the operator's primary direction of motion was initially to the left, the operator will eventually reach the leftmost work station (the row boundary) and will then switch the primary direction of motion to the right as shown in FIG. 4B. This right-biased motion will continue until the rightmost work station is reached, at which point the operator will switch back to the left-biased movement, etc. In this manner, the operator will eventually traverse every work station in the row.

In the foregoing procedure it is preferable that all operators shift in the same direction initially, in order to minimize confusion (except for the operator at the row boundary, if such an operator exists-in which case, that operator will start shifting in the opposite direction). As in the case with spiral rotation hereinbefore discussed, if the work-in-process is in continuous motion, it is more optimal for operators to initially move against the direction of the conveyor flow.

In connection with the present invention it is desirable to prepare operation books for use in the work stations which document the operation sequences to be performed in the work stations. Such operation books are prepared by a thorough examination of the end product to be manufactured in the plant and the necessary manufacturing operations to be performed to achieve this end product. In this connection there must be considered any operation precedence constraints arising from potential interdependencies and/or interference among the various manufacturing operations as hereinafter described.

Figure 5A:
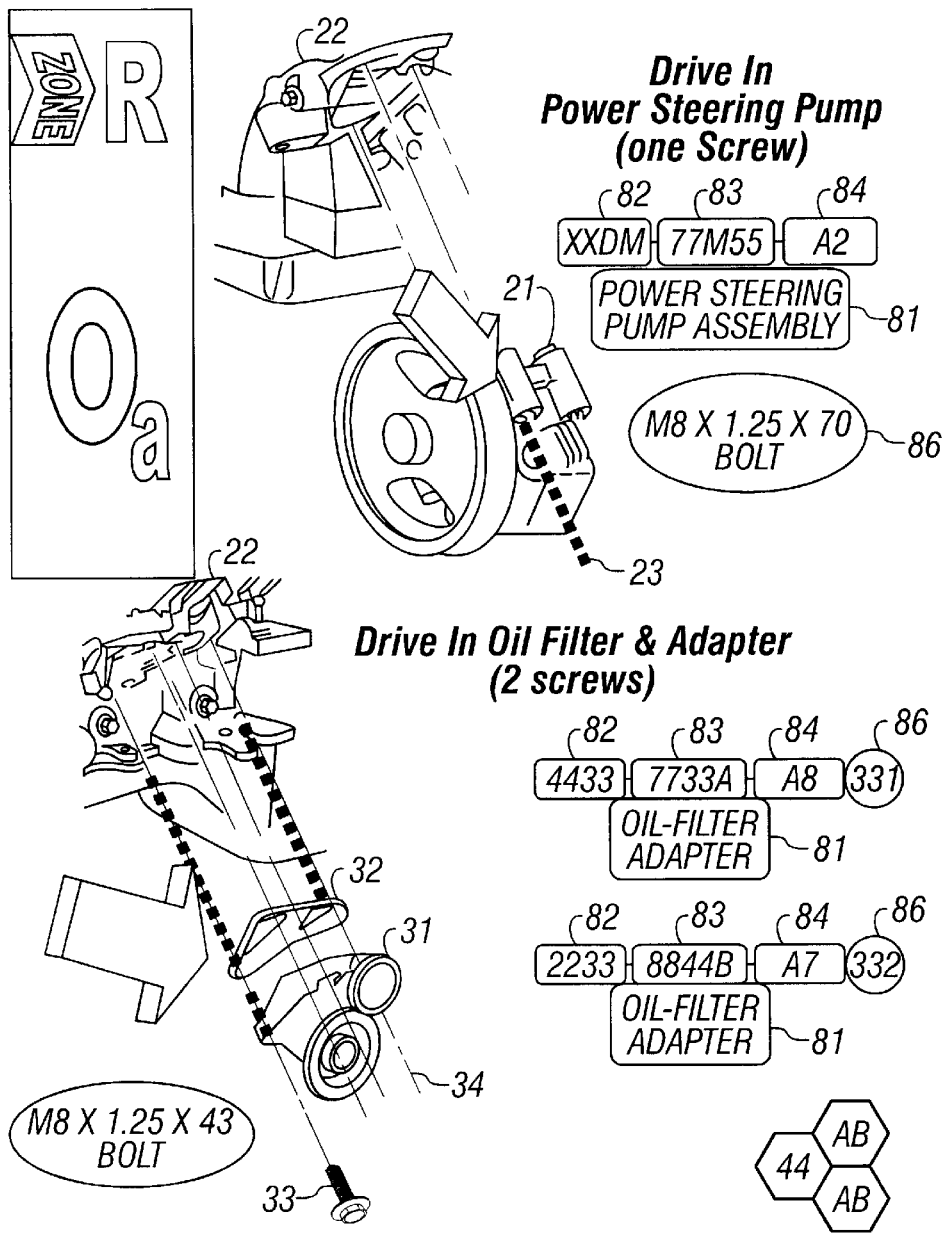
FIGS. 5A and 5B are illustrating pages of operation books utilized in connection with the present invention.
Figure 5B:
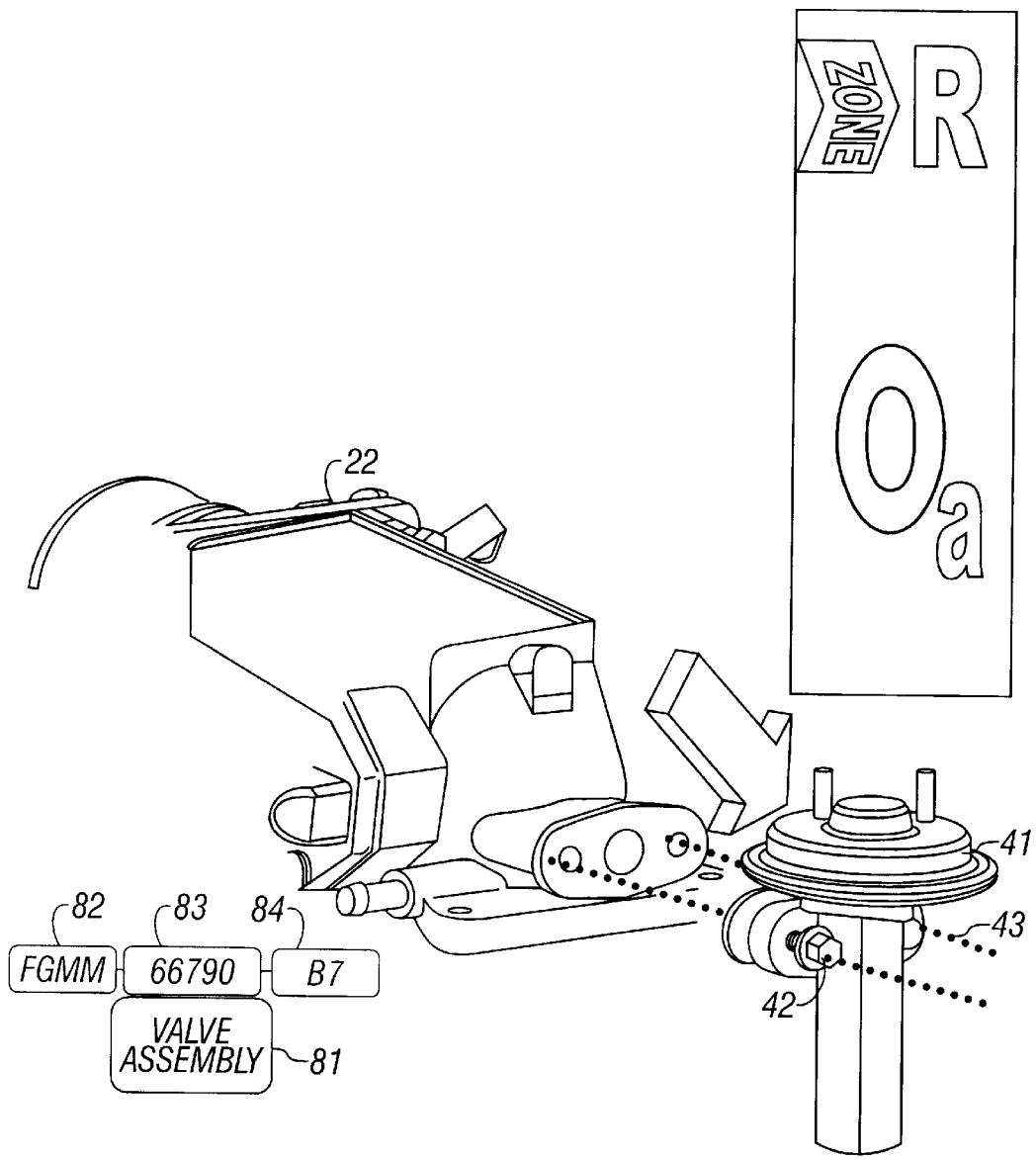

The operation book can be any plurality of images on a computer screen in the work station or in the form of a hard copy as for example, of a paper-based book having pages which can be turned, also located in the work station 13. Each operation book describes a sequence of grouped operations, where each group of operations corresponds to one of the seven hereinbefore described alignment categories. Each group of operations in the alignment category contains one or more examples of the associated alignment operation (i.e., a group may contain three $O_a$ operations, or six L operations, or two $B_r$ operations, etc.) to be performed in a specified zone in the manufacturing plant. Each page of the operation book or each pair of opposing pages in the book indicates the associated alignment category, and diagrams of various examples of that alignment category. For example see FIGS. 5A and 5B which comprise a single book page (page 44) which will actually be a pair of opposing pages of the paper-based book. There are two version numbers associated with each page; a process engineering version, and a shop floor version. In FIGS. 5A and 5B, both versions are the same (version AB), although it is possible for the versions to be different. When the required operations cannot be diagrammed on a single pair of pages, page continuations are used (e.g., page 44A may continue on to page 44B and thereafter onto page 44C, etc.). The operations group associated with page 44 and its continuation pages are operations that should be performed by the same operator in the specified zone R of the plant.

The page 44 by way of example as shown in FIG. SA includes a written description of the subassembly being operated upon provided within an area 81. Other identification is provided associated with the subassembly in a plurality of areas. In area 82 there is provided the engine type on which the power steering assembly is to be mounted. Area 83 can identify the part number. Area 84 can identify the drawing revision number. Still another area is provided underlying the area 81 to provide an identification of the fastener to be utilized as for example a specific bolt. Similar identifying areas are provided in the other depictions shown in the other illustrations appearing on page 44. Another area 86 is used to identify the type of engine on which the subsystem is being mounted.

It should be appreciated that the diagrams provided in the operation books need not be specified in complete detail since the operator typically would know the particular type of alignment operation required in that work station. An operations book may be used for multiple products (e.g., multiple models of a product), provided that both products require the same sequence of alignment types (e.g., two products require a set of L operations, then a set of P operations, then a set of $_O$ a operations, and then another set of L operations).

When an operator has completed the operations of the specified alignment category for that work station, the operator can turn the page or select the next computer screen.

In moving production lines, the operation books may be attached to structures that physically support the work-in-process along a moving line as for example a conveyor system. If a number of products are to be concurrently produced within the same work station utilizing the same alignment operation, then multiple operation books can be mounted in the same work station or alternatively a single operation book can be provided with multiple tabs where the alignment operations for each product can be separated by loose-leaf tabs.

When the work-in-process in the plant is in continuous motion, the delivery of materials and tools to the moving work-in-process is important. This can be facilitated by the use of synchronization zones wherein each such zone is associated with one of the seven alignment categories. The various zones can be labeled as by letters or colored tape on the factory floor. In addition the pages in the operation books can be similarly labeled with a corresponding synchronization zone so that a given page in the operation book indicates that the operation described on that page must be performed within the indicated zone. If the work to be performed does not actually lie within the zone indicated by the operation book, then an exception has occurred and the operator must stop the line and fix the problem by performing the required operation either offline or preferably in an adjacent zone, if the required materials or tools are still within relatively close proximity.

Figure 6:
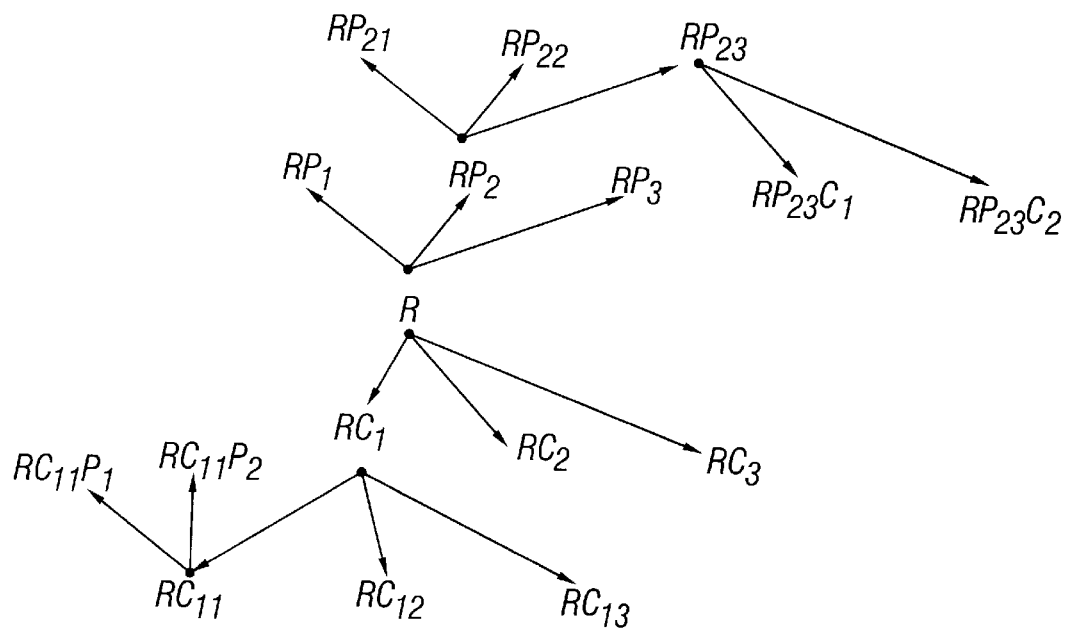
FIG. 6 shows an operation precedence graph utilized in connection with the preparation of operation books in accordance with the present invention.

In connection with providing operation books describing operation sequences it is desirable to generate an operation precedence graph of the type shown in FIG. 6. Such a precedence graph graphically shows the dependencies among various operations which will influence which operations can be grouped together during normalization as hereinafter described. A precedence graph such as shown in FIG. 6 can be constructed recursively. As shown in FIG. 6, the first root operation node is labeled R. The descendants from this root node R are labeled $RC_1$, $RC_2$, $RC_3$, etc., with the R identifying the parent and the C identifying the child and the order of birth being indicated by the numerals. The descendants of the children, i.e., the grandchildren, can be identified appropriately by $RC_{11}$, $RC_{12}$, $RC_{13}$, etc., designating the first, second and third born grandchildren of the child No. 1. The ancestors of the grandchild $RC_{11}$ can be identified as $RC_{11}P_1$ and $RC_{11}P_2$ with the $P_1$ and $P_2$ designating the parents of the grandchild $RC_{11}$. Thus it can be seen that with a given node N, N's parent node will contain the label of node N. prefixed with PN (P for parent), where the subscript N indicates the parent node's parental order (i.e., the parent's subscript will be 1, the second parent's subscript will be 2, etc.). Thereafter the descendants of the parent node can be labeled until all the descendants have been labeled. In this manner, siblings and cousins, and extended family can be labeled.

With the operation precedence being established in the graph shown in FIG. 6, the proposed sequence of operations must be normalized or adjusted if necessary to satisfy a series of constraints. In order to reduce the size of the search for feasible operation sequences, it is desirable that normalization be undertaken by normalizing in the following order. First it is desirable to group instances of the same alignment category so that multiple alignment operations can be performed at a single work station, provided that no undesirable interference is introduced relative to a subsequent dependent operation (which can be ascertained by examining the precedence graph) and no conflicts of interest are introduced to provide an alignment category grouping.

In connection with ascertaining an appropriate sequence of operations, it is desirable to consider the spatial constraints and the capacity of the conveyor system (if one exists). as well as whether work-in-process and final products are transported via a continuous or discrete (stop-and-go) conveyor. For example, if a continuous movement conveyor is used, operators might have less maneuvering room to perform certain operations. In the present invention it is desirable to minimize the number of work stations and to minimize the amount of movement of work-in-process.

In connection with a proposed sequence of operations it is necessary to be able to deliver materials to the work stations (either to specific locations, or a specific range of locations) which require those materials in a timely fashion, relative to the proposed operation sequence. Kitting is one way of providing additional flexibility for material delivery strategy, whereby the necessary materials for an operation are delivered in a container (the kit).

Also in connection with a proposed sequence of operations it is necessary to consider a feasible, practical and cost-effective way to move or position the tools (e.g., some tools can hang from the ceiling, with a good range of motion) to the work stations which require those tools in a timely fashion relative to the required operation sequence. Tooling constraints may require the ungrouping of certain operations since not all of the tools will be available at a given work station (e.g., some tools are fixed, rather than mobile). Also in connection with the proposed sequence of operations, additional normalizations are also necessary which are largely the domain of human judgment (rather than precise algorithms) including quality, ergonomics, government regulation, safety, union contracts, economic, social, etc.

In connection with the preparation of a sequence of operations, it may be necessary to provide buffers. The buffers are storage areas that lie outside the main manufacturing flow (e.g., stored in a sub-line that diverges from the main line). This enables buffer unloading/loading to proceed in parallel with work on the main line (i.e., without clogging or slowing down the main line). A buffer is "regulated" if it starts to fill up (up until its fill point, which depends on the buffer's capacity) whenever the production flow is blocked, that is, whenever work cannot proceed downstream to the next work station (e.g., that work station may be down for repairs). Once the flow is unblocked, the buffer can start to empty its contents and transfer these contents to the now-available next work station.

Each boundary between an alignment unit producing one system and an alignment unit producing the next system or subsystem is a candidate for buffering (e.g., the boundary between the "power plant" subsystem and "mechanical" subsystem in the engine example hereinbefore described). At each candidate buffer point, the tradeoff between the cost of the buffer versus the cost of waiting (due to the absence of a buffer, and the consequent work station starvation) must be evaluated. The buffering of empty pallets or containers is a special case of buffering subassemblies or production products (where the empty pallet or container may be viewed as a "null" subassembly) and can be used to regulate the supply of fresh, empty pallets or containers.

In connection with the present invention it is also possible to utilize batching. In batch production, or the concurrent production (and the concurrent movement or transfer) of multiple units (whether final products or subassemblies) of the same type (i.e., before producing some other type of unit) using the same setup configuration (e.g., of complex tools or other equipment) is desirable when there is a sufficient minimum setup time, which can be a big time and labor saver (by eliminating the need for multiple, costly setups).

From the foregoing it can be seen that there has been provided a new and improved alignment-based rigid-body manufacturing plant, system and method which has many advantages, which has improved quality, productivity and flexibility. The quality is greatly improved by providing linear feedback to provide self-correction. Productivity is greatly increased by using rotating operators in alignment-based work stations, eliminating idle time or wait states. Homogeneous alignment dynamics utilized during production breaks theoretical minimum process times. The homogeneous dynamics abstracted from tools results in expertise which transcends individual components. Generic categories of alignments are utilized to manufacture a wide variety of products. The mobile rotating work force makes it possible for operators to work at their own speed while eliminating idle time and avoiding conflicts of interest. Short runs are made feasible by substantially zero setup costs, making it possible for a production line to simultaneously produce diverse types of products in batches of arbitrary size. With the present invention operators become expert alignment specialists capable of performing alignments with similar dynamics on a variety of components, subassemblies and final assemblies. The operators are capable of achieving high levels of quality in connection with self-correcting alignment-based manufacturing operations. The alignment units are self-scheduling, requiring no external scheduling or expediting.

In connection with the present invention quality continuously improved (without extra effort), increasing productivity and reducing quality-related costs. Operators become expert alignment specialists, capable of performing alignments with similar dynamics (which are abstracted over concrete movements) on a variety of components, subassemblies and final assemblies. The expertise (and therefore, quality) level of operators naturally increases over time, due to this focus on an alignment specialty. This enables the operators to achieve high levels of quality (reversing the existing trend where highly skilled operators achieve only standardized levels of quality). Quality also improves as a result of the self-correcting nature of alignment-based manufacturing operations. Since they contain no redundancies, unique work centers (and therefore, a unique individual) is always responsible, and therefore accountable for the result. Quality deviations can be detected by the next work station in the flow (such that the next operation in the sequence cannot be performed if the previous operation was performed poorly or incorrectly), with reduced reliance on external quality control monitoring.

What is claimed is:

1. A manufacturing plant for manufacturing rigid bodies comprised of a plurality of parts to be assembled by at least two operators having hierarchical skill levels selected from alignment types ranging from $O_r$ to P selected from an alignment transformation consisting of $O_r$, $O_a$, $B_r$, $B_a$, S, L and P, comprising an alignment unit having at least three work stations, each of said work stations being capable of having associated therewith dynamically occurring manufacturing operations selected from one or more of the dynamically occurring alignment-based transformation of manufacturing operations identified as alignment types $O_r$, $O_a$, $B_r$, $B_a$, S, L and P and having parts of the rigid bodies to be assembled in the manufacturing plant being delivered to the at least three work stations in accordance with the alignment-based manufacturing operation to be performed at the work stations to provide work-in-process whereby each of the at least two operators can perform at least one alignment-based manufacturing operation at each work station to provide a subsystem and thereafter permitting the operator to move from that one work station to another work station to perform another alignment-based manufacturing operation within the hierarchical skill level of the operator at the another work station.

2. A manufacturing plant as in claim 1 wherein each work station includes means for changing the alignment type associated with the work station upon completion of an alignment operation by an operator at the work station.

3. A manufacturing plant as in claim 1 wherein the at least two operators are a part of a mobile rotating work force and in which the work stations in the alignment unit are disposed in pairs of adjacent rows whereby the operators can readily move between the two rows, permitting them to travel in elliptical orbits between the work stations in the two rows.

4. A manufacturing plant as in claim 3 wherein the two rows are parallel to each other.

5. A manufacturing plant as in claim 3 where each operation station includes an operation book to document the operation sequences to be performed at that work station.

6. A manufacturing plant as in claim 3 wherein said work stations are arranged in a single row and wherein the operators first traverse the single row in one direction and thereafter traverse the single row in an opposite direction.

7. A manufacturing plant as in claim 1 wherein material is delivered to each of the work stations as the material is required at the work station.

8. A manufacturing plant as in claim 1 wherein the work-in-process is in substantially continuous motion and wherein the work-in-process passes through synchronization zones with each synchronization zone having associated therewith an alignment type and wherein means is provided for delivering the parts and providing the necessary tooling in each synchronization zone.

9. A manufacturing plant as in claim 8 further including a buffer at a work station to promote work-in-process flow between subsystems.

10. A manufacturing system for manufacturing rigid bodies comprised of a plurality of parts certain of which have surfaces to be joined together and certain of which have edges to be joined together to be assembled by at least two operators at least three work stations to produce a rigid-body product comprising providing operators which have alignment-based hierarchical manufacturing skills, providing an alignment unit having a plurality of work stations, each of the work stations having associated therewith an alignment type selected from one of seven alignment types $O_r$, $O_a$, $B_r$, $B_a$, S, L and P, said alignment types being arranged in a skill hierarchy with the $O_a$ alignment type being of the highest skill in the skill hierarchy and P being of the lowest skill in the skill hierarchy, supplying the tools necessary at each work station to perform the alignment operations assigned to the work station, causing an operator having a skill level at least as high as that required for the work station to perform the alignment-based operation at that work station, permitting the operator at that work station to move to another work station to perform an operation at another work station which is within the operator's skill hierarchy and permitting each operator to move asynchronously between the work stations to complete alignment operations at the work stations within the hierarchical skill capabilities of the operator to complete the rigid-body product.

11. A system as in claim 10 in which each of the work stations has work in process which remains at the work station for at least a plurality of alignment-based operations.

* * * * *